United States Patent
Arneson et al.

(10) Patent No.: US 9,218,229 B2
(45) Date of Patent: Dec. 22, 2015

(54) EVENT NOTIFICATION SYSTEM AND METHOD

(75) Inventors: Kenneth Arneson, King, WA (US); John Clark, King, WA (US); Lawrence J. Corvari, King, WA (US)

(73) Assignee: TeleCommunication Systems, Inc., Annapolis, MD (US)

(*) Notice: Subject to any disclaimer, the term of this patent is extended or adjusted under 35 U.S.C. 154(b) by 0 days.

(21) Appl. No.: 12/292,371

(22) Filed: Nov. 18, 2008

(65) Prior Publication Data
US 2009/0077188 A1 Mar. 19, 2009

Related U.S. Application Data

(63) Continuation of application No. 09/853,187, filed on May 11, 2001, now abandoned.

(60) Provisional application No. 60/203,648, filed on May 12, 2000.

(51) Int. Cl.
| | |
|---|---|
| G06F 15/16 | (2006.01) |
| G06F 9/54 | (2006.01) |
| H04L 29/06 | (2006.01) |
| H04L 29/08 | (2006.01) |

(52) U.S. Cl.
CPC .............. G06F 9/542 (2013.01); H04L 63/04 (2013.01); H04L 63/10 (2013.01); H04L 67/16 (2013.01); H04L 67/327 (2013.01)

(58) Field of Classification Search
CPC ....... H04L 67/327; H04L 67/16; H04L 63/04; H04L 63/10
USPC ................ 709/205, 200, 206; 455/412.2, 415
See application file for complete search history.

(56) References Cited

U.S. PATENT DOCUMENTS

| | | |
|---|---|---|
| 1,103,073 A | 7/1914 | O'Connel |
| 4,494,119 A | 1/1985 | Wimbush |
| 4,651,156 A | 3/1987 | Martinez |
| 4,706,275 A | 11/1987 | Kamil |
| 4,891,638 A | 1/1990 | Davis |
| 4,891,650 A | 1/1990 | Sheffer |
| 4,952,928 A | 8/1990 | Carroll et al. |
| 5,014,206 A | 5/1991 | Scribner et al. |
| 5,043,736 A | 8/1991 | Darnell et al. |
| 5,055,851 A | 10/1991 | Sheffer |
| 5,068,656 A | 11/1991 | Sutherland |
| 5,068,891 A | 11/1991 | Marshall |
| 5,070,329 A | 12/1991 | Jasinaki |

(Continued)

*Primary Examiner* — Richard G Keehn
(74) *Attorney, Agent, or Firm* — William H. Bollman (57) ABSTRACT

A notification system comprises a plurality of claim checks and a plurality of communication device identifiers. The notification system further comprises a messaging module that is configured to receive an electronic notification of an event. The messaging module is further configured to associate at least one of the claim checks and one of the communication device identifiers with the event. The messaging module is also configured to generate a message that contains the associated claim check and transmit the message to a communications device identified by the communication device identifier. In one embodiment, the notification system further comprises a retrieval module that is responsive to a request to access the event. In another embodiment, the messaging module is configured to receive an electronic notification of a second event and associate the claim check and another communication device identifier with the message.

5 Claims, 7 Drawing Sheets

(56) References Cited

U.S. PATENT DOCUMENTS

| | | |
|---|---|---|
| 5,081,667 A | 1/1992 | Droro et al. |
| 5,119,104 A | 6/1992 | Heller |
| 5,144,283 A | 9/1992 | Arens et al. |
| 5,177,478 A | 1/1993 | Wagai et al. |
| 5,193,215 A | 3/1993 | Olmer |
| 5,208,756 A | 5/1993 | Song |
| 5,214,789 A | 5/1993 | George |
| 5,218,367 A | 6/1993 | Sheffer et al. |
| 5,223,844 A | 6/1993 | Mansell et al. |
| 5,235,630 A | 8/1993 | Moody et al. |
| 5,266,944 A | 11/1993 | Carroll et al. |
| 5,289,527 A | 2/1994 | Tiedemann, Jr. |
| 5,293,642 A | 3/1994 | Lo |
| 5,299,132 A | 3/1994 | Wortham |
| 5,325,302 A | 6/1994 | Izidon et al. |
| 5,334,974 A | 8/1994 | Simms et al. |
| 5,343,493 A | 8/1994 | Karimullah |
| 5,347,568 A | 9/1994 | Moody et al. |
| 5,351,235 A | 9/1994 | Lahtinen |
| 5,361,212 A | 11/1994 | Class et al. |
| 5,363,425 A | 11/1994 | Mufti et al. |
| 5,374,936 A | 12/1994 | Feng |
| 5,379,451 A | 1/1995 | Nakagoshi et al. |
| 5,381,338 A | 1/1995 | Wysocki et al. |
| 5,387,993 A | 2/1995 | Heller et al. |
| 5,388,147 A | 2/1995 | Grimes |
| 5,390,339 A | 2/1995 | Bruckert et al. |
| 5,394,158 A | 2/1995 | Chia |
| 5,396,227 A | 3/1995 | Carroll et al. |
| 5,398,190 A | 3/1995 | Wortham |
| 5,406,614 A | 4/1995 | Hara |
| 5,418,537 A | 5/1995 | Bird |
| 5,423,076 A | 6/1995 | Westergren et al. |
| 5,432,841 A | 7/1995 | Rimer |
| 5,434,789 A | 7/1995 | Fraker et al. |
| 5,454,024 A | 9/1995 | Lebowitz |
| 5,461,390 A | 10/1995 | Hoshen |
| 5,470,233 A | 11/1995 | Fruchterman et al. |
| 5,479,408 A | 12/1995 | Will |
| 5,479,482 A | 12/1995 | Grimes |
| 5,485,161 A | 1/1996 | Vaughn |
| 5,485,163 A | 1/1996 | Singer et al. |
| 5,488,563 A | 1/1996 | Chazelle et al. |
| 5,497,149 A | 3/1996 | Fast |
| 5,508,931 A | 4/1996 | Snider |
| 5,513,243 A | 4/1996 | Kage |
| 5,515,287 A | 5/1996 | Hakoyama et al. |
| 5,519,403 A | 5/1996 | Bickley et al. |
| 5,532,690 A | 7/1996 | Hertel |
| 5,535,434 A | 7/1996 | Siddoway et al. |
| 5,539,398 A | 7/1996 | Hall et al. |
| 5,543,776 A | 8/1996 | L'Esperance et al. |
| 5,552,772 A | 9/1996 | Janky et al. |
| 5,555,286 A | 9/1996 | Tendler |
| 5,568,119 A | 10/1996 | Schipper et al. |
| 5,574,648 A | 11/1996 | Pilley |
| 5,579,372 A | 11/1996 | Astrom |
| 5,588,009 A | 12/1996 | Will |
| 5,592,535 A | 1/1997 | Klotz |
| 5,604,486 A | 2/1997 | Lauro |
| 5,606,313 A | 2/1997 | Allen et al. |
| 5,606,850 A | 3/1997 | Nakamura |
| 5,610,815 A | 3/1997 | Gudat et al. |
| 5,614,890 A | 3/1997 | Fox |
| 5,615,116 A | 3/1997 | Gudat et al. |
| 5,621,793 A | 4/1997 | Bednarek et al. |
| 5,628,051 A | 5/1997 | Salin |
| 5,633,912 A | 5/1997 | Tsoi |
| 5,673,306 A | 9/1997 | Amadon et al. |
| 5,682,600 A | 10/1997 | Salin |
| 5,692,037 A | 11/1997 | Friend |
| 5,740,534 A | 4/1998 | Ayerst et al. |
| 5,761,618 A | 6/1998 | Lynch et al. |
| 5,767,795 A | 6/1998 | Schaphorst |
| 5,768,509 A | 6/1998 | Gunluk |
| 5,774,533 A | 6/1998 | Patel |
| 5,787,357 A | 7/1998 | Salin |
| 5,794,142 A | 8/1998 | Vanttila et al. |
| 5,797,091 A | 8/1998 | Clise et al. |
| 5,797,094 A | 8/1998 | Houde et al. |
| 5,797,096 A | 8/1998 | Lupien et al. |
| 5,802,492 A | 9/1998 | DeLorme et al. |
| 5,806,000 A | 9/1998 | Vo et al. |
| 5,822,700 A | 10/1998 | Hult et al. |
| 5,828,740 A | 10/1998 | Khuc et al. |
| 5,905,736 A | 5/1999 | Rohen et al. |
| 5,920,821 A | 7/1999 | Seazholtz et al. |
| 5,928,325 A * | 7/1999 | Shaughnessy et al. ....... 709/206 |
| 5,930,701 A | 7/1999 | Skog |
| 5,943,399 A | 8/1999 | Bannister et al. |
| 5,946,629 A | 8/1999 | Sawyer et al. |
| 5,946,630 A | 8/1999 | Willars et al. |
| 5,950,130 A | 9/1999 | Coursey |
| 5,953,398 A | 9/1999 | Hill |
| 5,974,054 A | 10/1999 | Couts et al. |
| 5,978,685 A | 11/1999 | Laiho |
| 5,987,323 A | 11/1999 | Huotari |
| 5,999,811 A | 12/1999 | Molne |
| 6,035,025 A | 3/2000 | Hanson |
| 6,049,710 A | 4/2000 | Nilsson |
| 6,058,300 A | 5/2000 | Hanson |
| 6,064,875 A | 5/2000 | Morgan |
| 6,070,067 A | 5/2000 | Nguyen et al. |
| 6,075,982 A | 6/2000 | Donovan et al. |
| 6,081,508 A | 6/2000 | West et al. |
| 6,101,378 A | 8/2000 | Barabash et al. |
| 6,122,503 A | 9/2000 | Daly |
| 6,122,520 A | 9/2000 | Want et al. |
| 6,148,197 A | 11/2000 | Bridges et al. |
| 6,148,198 A | 11/2000 | Anderson et al. |
| 6,149,353 A | 11/2000 | Nilsson |
| 6,169,891 B1 | 1/2001 | Gorham et al. |
| 6,173,181 B1 | 1/2001 | Losh |
| 6,181,935 B1 | 1/2001 | Gossman et al. |
| 6,188,752 B1 | 2/2001 | Lesley |
| 6,198,431 B1 | 3/2001 | Gibson |
| 6,199,045 B1 | 3/2001 | Giniger et al. |
| 6,205,330 B1 | 3/2001 | Winbladh |
| 6,208,854 B1 | 3/2001 | Roberts et al. |
| 6,223,046 B1 | 4/2001 | Hamill-Keays et al. |
| 6,226,529 B1 | 5/2001 | Bruno et al. |
| 6,249,680 B1 | 6/2001 | Wax et al. |
| 6,249,744 B1 | 6/2001 | Morita |
| 6,256,614 B1 | 7/2001 | Wecker |
| 6,266,614 B1 | 7/2001 | Alumbaugh |
| 6,289,373 B1 | 9/2001 | Dezonno |
| 6,317,594 B1 | 11/2001 | Gossman et al. |
| 6,327,479 B1 | 12/2001 | Mikkola |
| 6,396,913 B1 | 5/2002 | Perkins, III |
| 6,405,175 B1 | 6/2002 | Ng |
| 6,421,707 B1 | 7/2002 | Miller |
| 6,633,910 B1 * | 10/2003 | Rajan et al. ................... 709/224 |
| 6,636,733 B1 * | 10/2003 | Helferich ................... 455/412.2 |
| 6,687,877 B1 * | 2/2004 | Sastry et al. ................... 715/201 |
| 6,981,061 B1 * | 12/2005 | Sakakura ....................... 709/248 |
| 7,240,022 B1 | 7/2007 | Bistriceanu |
| 7,716,077 B1 * | 5/2010 | Mikurak ....................... 705/7.12 |
| 8,032,409 B1 * | 10/2011 | Mikurak .................... 705/14.39 |
| 8,121,874 B1 * | 2/2012 | Guheen et al. ............... 705/7.11 |

\* cited by examiner

EVENT NOTIFICATION SYSTEM AND METHOD

This application is a continuation of U.S. application Ser. No. 09/853,187, filed May 11, 2001 now abandoned, entitled "Event Notification System and Method;" which in turn claims priority from U.S. Provisional Application No. 60/203,648, filed May 12, 2000, both of which are expressly incorporated herein by reference.

BACKGROUND OF THE INVENTION

1. Field of the Invention

This invention relates generally to The field of event notification. More particularly, the invention relates to a system and method for notifying a remotely located entity user of an occurrence of an event.

2. Background of Related Art

Use of on-line computer services, such as, by way of example, electronic mail ("e-mail"), travel reservation services, stock trading services, auction services, and the like, have increased dramatically. Fueling this dramatic increase in the usage of on-line computer services is the emergence of the Internet, and more specifically, the World Wide Web ("WWW"). The ease with which a user can locate and utilize the resources on the WWW has enabled the WWW to emerge as a viable medium for a vendor to offer its on-line services. Typically, the vendor maintains a web server or web site, which is a location on the WWW, through which its on-line services may be utilized.

A user uses a computer to connect to the WWW and to navigate and access the vendor's web site. Once connected to the web site, the user utilizes the available on-line services through his or her computer. For example, the user may utilize a particular vendor's e-mail messaging service. The user can then register with, and receive his or her e-mail messages through the e-mail services offered by the particular vendor. Subsequently, e-mail messages addressed to the user will be received at the vendor's web site. The user can then use his or her computer to connect to the vendor's web site and determine if any new messages have arrived.

In many conventional systems, the user needs to be at a computer or a terminal to connect to the web site and utilize the on-line services. For example, the user uses the computer to check for, and access received messages. The connected computer is also used to trigger or activate a feature or function provided by the on-line service. For example, in responding to a received message, the user composes the response message using his or her computer. Thus, the on-line services are generally not accessible beyond the web site and the computers and terminals the user uses to connect to the web site.

SUMMARY OF THE INVENTION

The present invention extends electronic commerce services and features to devices beyond a consumer's personal computer. An electronic retailer ("e-tailer") provides messaging services to consumers that notify the consumers of certain events the consumer is interested in. In one embodiment, the consumer is notified of the event via a message sent to his or her communications device, such as a wireless digital phone.

In another embodiment, an e-tailer offers a service to users. In conjunction with the service, the e-tailer provides the user the option of receiving wireless notification of specific events associated with the service. The user, subsequent to being offered the service, advantageously registers for the service, and the associated wireless notification. In registering for the service, the user specifies the particular event or events the user desires to be notified of, as well as the communications device address, such as the wireless device phone number, which is to receive the notification.

The e-tailer notifies a notification system of the user's desire to receive notification of specified events. Subsequently, the e-tailer forwards the event messages associated with the particular service, and which is addressed to the user, to the notification system. Subsequent to receiving the event message, the notification system determines if the event message is one which the user requested to be notified of. If the user requested to be notified of the event message, the notification system generates a message and assigns a claim check, from a pool of claim checks, to the event message.

In one embodiment, the claim check is a phone number which may be used to contact the notification system in order to retrieve the associated event message. The notification system maintains a pool of such phone numbers (the pool of claim checks) which may be used in contacting the notification system. Subsequent to assigning a claim check, the notification system initiates a call to the user's communications device. The notification system then transmits both the message and the claim check to the wireless device. In one embodiment, the message is displayed on a wireless device display, and the user is provided an option to initiate a call to the notification system by pressing a key on the wireless device. If the user presses the appropriate key, the wireless device contacts the notification system by dialing the number specified by the previously received claim check.

Subsequent to receiving a call to one of the claim check numbers, the notification system verifies the calling wireless device number to authenticate the calling user. Having authenticated the user, the notification system retrieves the appropriate event message and reads the event message to the user. Furthermore, the notification system may provide the user with options to initiate additional activities.

One embodiment relates to a method of providing electronic mail notification to a communications device wherein the method comprises the acts of associating an electronic mail message with a first phone number such that the information about the electronic mail message is provided when a communications device calls the first phone number, sending the first phone number to the communications device, and providing information about the electronic mail message when the communications device calls the first phone number.

Another embodiment relates to a method of providing an event notification wherein the method comprises the acts of receiving an electronic notification of an event and associating the received electronic notification with at least one phone number. The method also comprises generating a message that contains the associated phone number, and transmitting the message to a communications device.

An additional embodiment relates to a method that comprises associating at least one claim check with an event and at least one communication device identifier with the event; and generating a message for a communications device wherein the message contains the associated claim check. Yet another embodiment relates to a method of providing an event notification wherein the method comprises associating a first claim check and a first communication device identifier with a first event; and associating the first claim check and a second communications device identifier with a second event.

One embodiment relates to a method of providing an event notification wherein the method comprises associating a first claim check and a first communication device identifier with a first event and generating for a first communications device a first message comprising the first claim check. The method further comprises associating a second claim check and the first communications device identifier with a second event; and generating for the first communications device a second message comprising the second claim check.

Another embodiment relates to a notification system for a communications device that comprises a plurality of phone numbers, and a messaging module executing on a processor. The messaging module is configured to receive an electronic notification of an event and associate at least one phone number with the event. The messaging module is further configured to generate a message for a communications device wherein the message contains the phone number.

An additional embodiment relates to a notification system that comprises a plurality of claim checks and a messaging module. The messaging module is configured to receive an electronic notification of at least one event. The messaging module is configured to associate at least one of the claim checks with the event and is further configured to generate a message that contains the claim check.

One embodiment relates to a notification system that comprises a plurality of claim checks and a plurality of communication device identifiers associated with a plurality of entities. The notification system also comprises a messaging module that is configured to receive electronic data about an event for an entity. The messaging module is configured to associate the electronic data about the event with at least one of the claim checks and one of the communication device identifiers associated with the entity. The messaging module is further configured to generate a message that contains the associated claim check.

Another embodiment relates to a notification system that comprises a plurality of claim checks, a plurality of communication device identifiers and a messaging module. The messaging module that is configured to receive electronic notification of a first event and a first claim check and a first communication device identifier with the first event. The messaging module is further configured to receive electronic notification of a second event and to associate the first claim check and a second communication device identifier with the second event.

An additional embodiment relates to a notification system that comprises a means for storing a plurality of phone numbers and a means for receiving an electronic notification of an event. The notification system further comprises a means for associating at least one of the phone numbers with the event and a means for generating a message that contains the phone number. The notification system also comprises a means for transmitting the message to a communications device.

One embodiment relates to a notification system that comprises a means for maintaining a plurality of claim checks and a means for maintaining a plurality of device check identifiers. The notification system further comprises a means for receiving an electronic notification of an event and a means for associating at least one of the claim checks and one of the device identifiers with information about the event. The notification system further comprises a means for generating a message that contains the associated claim check.

Another embodiment relates to a notification system that comprises a means for storing a plurality of claim checks and a means for storing a plurality of communication device identifiers. The notification system further comprises a means for receiving an electronic notification of a first event; and a means for associating a first claim check and a first communication device identifier with information about the first event. The notification system also comprises a means for generating a message for the first event and a means for transmitting the message to the communications device identified by the first communication device identifier. The notification system additionally comprises a means for receiving an electronic notification of a second event; and a means for associating a second claim check and the first communication device identifier with information about the second event.

For purposes of summarizing the invention, certain aspects, advantages and novel features of the invention have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

BRIEF DESCRIPTION OF THE DRAWINGS

Features and advantages of the present invention will become apparent to those skilled in the art from the following description with reference to the drawings, in which.

DETAILED DESCRIPTION OF ILLUSTRATIVE EMBODIMENTS

Figure 1:
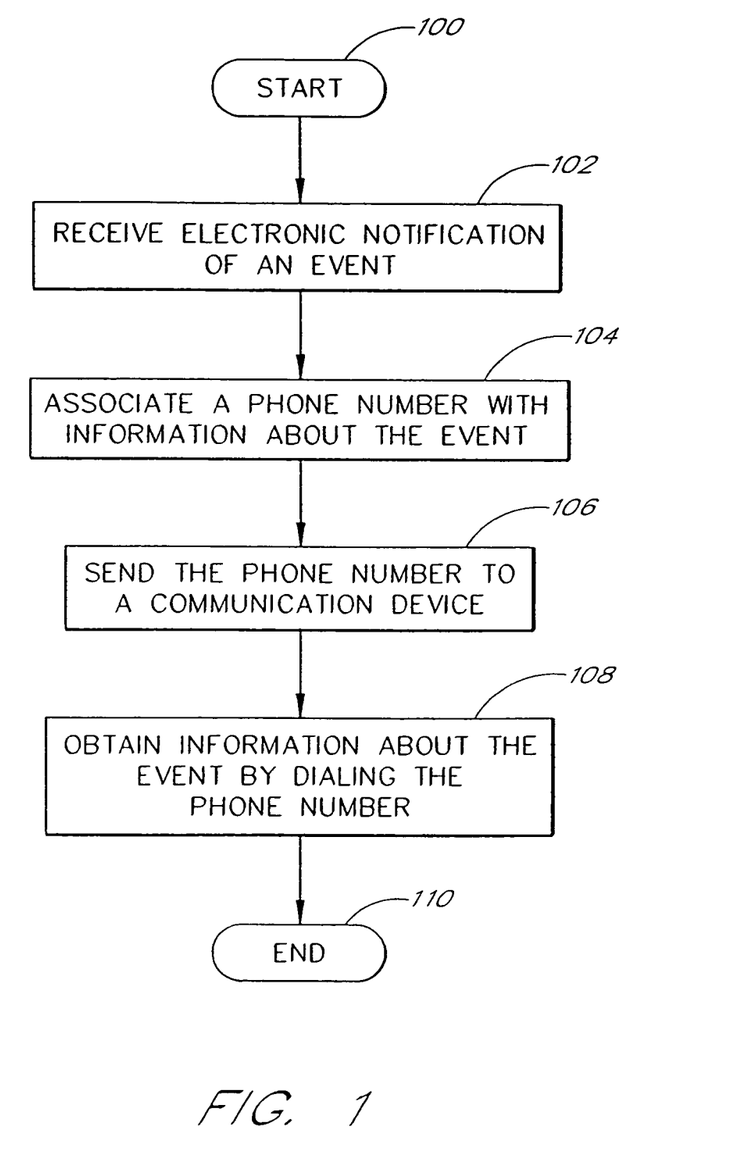
FIG. 1 is a high level block diagram illustrating an embodiment of the process by which a notification system sends an event notification to a user and how the event is retrieved by the user according to one embodiment of the invention.

FIG. 1 is a high level block diagram illustrating one embodiment of the overall process of the invention. In particular, FIG. 1 illustrates a process by which a notification system transmits an event notification to a user and how the user retrieves information about the associated event. Beginning in a start state 100 and proceeding to state 102, the notification system receives an electronic notification of an event, such as an e-mail message, for a registered user. The event may be received in the form of an event message.

Proceeding to state 104, the notification system associates a phone number or other type of identifier with information about the event. In one embodiment, the phone number may be one of a bank of phone numbers maintained by the notification system. Proceeding to state 106, the notification system sends the associated phone number to a communications device. For example, the associated phone number may be sent as part of a text message, page or short message system.

Proceeding to state 108, a user of the communications device may then access information about the event by dialing the associated phone number. For example, the user may respond by depressing a key, such as the "send" key, on a wireless communications device. Upon dialing the phone number, the notification system provides the information about the event. In one embodiment, information about the event is read to the user. In still another embodiment, the notification system may transmit additional textual information about the event to the communications device.

Figure 2:
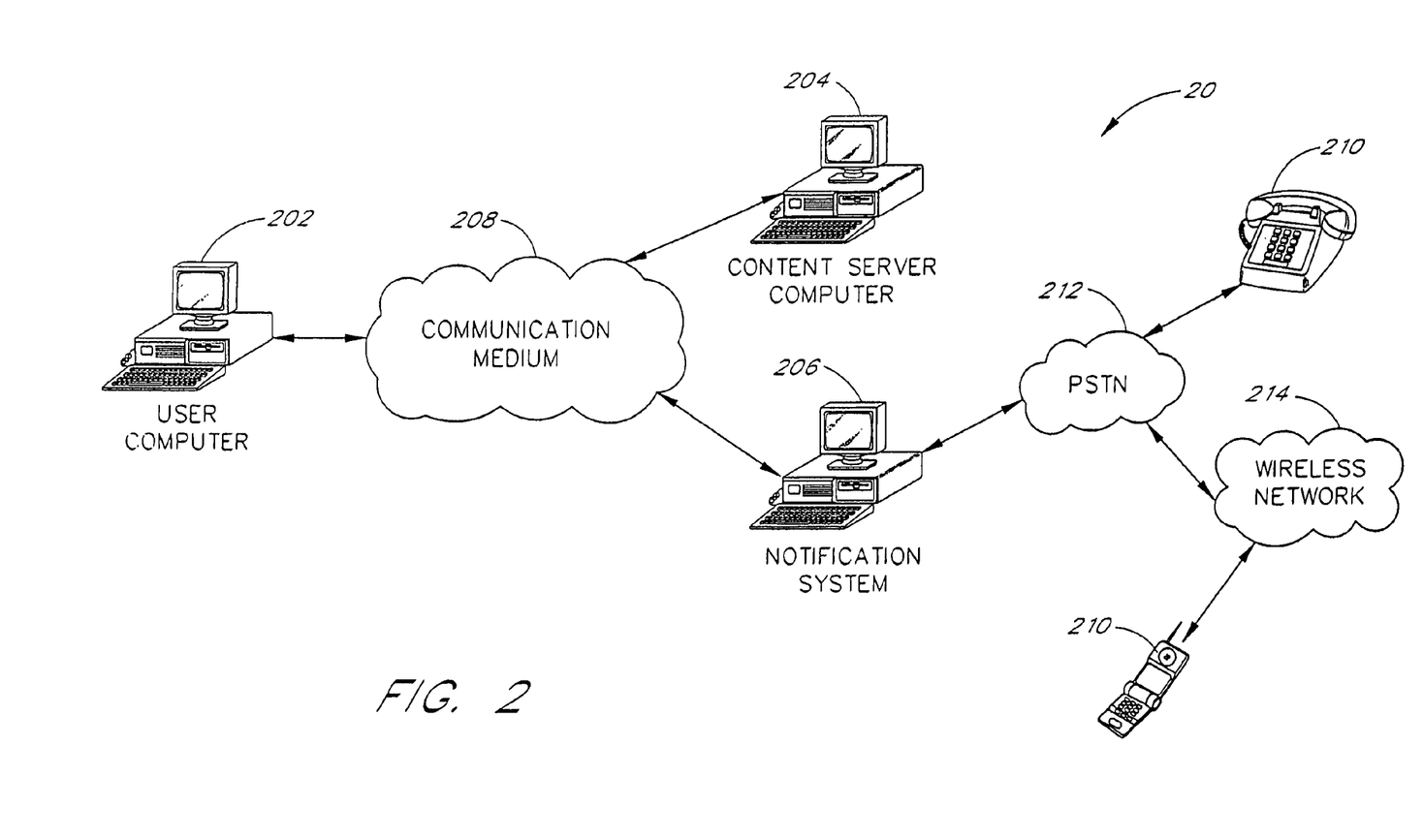
FIG. 2 is a system block diagram illustrating one embodiment of the overall network architecture.

One network architecture suitable for use with one embodiment of the invention is indicated generally by a system 20 in FIG. 2. The system 20 includes a user computer 202, content server computer 204, and a notification system 206 which communicate with each other through a communication medium 208. Moreover, the notification system 206 communicates with communication devices 210 utilizing a PSTN 212 and a wireless network 214.

A computer, including the computers 202, 204, and the notification system 206, may be any microprocessor or processor (hereinafter referred to as processor) controlled device that permits access to the communication medium 208, including terminal devices, such as personal computers, workstations, servers, mini computers, main-frame computers, laptop computers, a network of individual computers, mobile computers, palm top computers, hand held computers, set top box for a TV, an interactive television, an interactive kiosk, a personal digital assistant, an interactive wireless communications device, or a combination thereof. The computers may further possess input devices such as a keyboard or a mouse, and output devices such as a computer screen or a speaker. Furthermore, the computers may serve as clients, servers, or a combination thereof.

These computers may be single processor or multiprocessor machines. Additionally, these computers include an addressable storage medium or computer accessible medium, such as random access memory (RAM), an electronically erasable programmable read-only memory (EEPROM), programmable read-only memory (PROM), erasable programmable read-only memory (EPROM), hard disks, floppy disks, laser disk players, digital video devices, compact disks, video tapes, audio tapes, magnetic recording tracks, electronic networks, and other techniques to transmit or store electronic content such as, by way of example, programs and data. In one preferred embodiment, the computers are equipped with a network communication device such as a network interface card, a modem, or other network connection device suitable for connecting to the communication medium 208. Furthermore, the computers execute an appropriate operating system such as Unix, Microsoft® Windows® 3.1, Microsoft® Windows® 95, Microsoft® Windows® N98 Microsoft® Windows® NT, Apple® MacOS®, or IBM® OS/2®. As is conventional, the appropriate operating system includes a communications protocol implementation which handles all incoming and outgoing message traffic passed over the communication medium 208. In other embodiments, while the operating system may differ depending on the type of computer, the operating system will continue to provide the appropriate communications protocols necessary to establish communication links with the communication medium 208.

The computers may advantageously contain program logic, or other substrate configuration representing data and instructions, which cause the computer to operate in a specific and predefined manner as described herein. In one embodiment, the program logic may advantageously be implemented as one or more modules. The modules may advantageously be configured to reside on the addressable storage medium and configured to execute on one or more processors. The modules include, but are not limited to, software or hardware components which perform certain tasks. Thus, a module may include, by way of example, components, such as, software components, object-oriented software components, class components and task components, processes methods, functions, attributes, procedures, subroutines, segments of program code, drivers, firmware, microcode, circuitry, data, databases, data structures, tables, arrays, and variables.

The communication medium 208 may advantageously facilitate the transfer of electronic content. In one embodiment, the communication medium 208 includes the Internet. The Internet is a global network connecting millions of computers. The structure of the Internet, which is well known to those of ordinary skill in the art, is a global network of computer networks utilizing a simple, standard common addressing system and communications protocol called Transmission Control Protocol/Internet Protocol (TCP/IP). The connection between different networks are called "gateways", and the gateways serve to transfer electronic data worldwide.

One part of the Internet is the World Wide Web (WWW). The WWW is generally used to refer to both (1) a distributed collection of interlinked, user-viewable hypertext documents (commonly referred to as "web documents" or "web pages" or "electronic pages" or "home pages") that are accessible via the Internet, and (2) the client and server software components which provide user access to such documents using standardized Internet protocols. The web documents are encoded using Hypertext Markup Language (HTML) and the primary standard protocol for allowing applications to locate and acquire web documents is the Hypertext Transfer Protocol (HTTP). However, as used herein, the term WWW is intended to encompass future markup languages and transport protocols which may be used in place of, or in addition to, HTML and HTTP.

The WWW contains different computers which store electronic pages, such as HTML documents, capable of displaying graphical and textual information. The content server computer 204 which provides information and services, such as, by way of example, e-mail services, auction services, and reservation services, on the WWW is generally referred to as a "web site." A web site is defined by an Internet address, and the Internet address has an associated electronic page. The electronic page is advantageously associated with a Uniform Resource Locator ("URL"). Generally, an electronic page may advantageously be a document which organizes the presentation of text, graphical images, audio and video.

One of ordinary skill in the art will recognize that the communication medium 208 may advantageously be comprised of other types of networks without detracting from the scope of the invention. The communication medium 208 can include, by way of example, local area networks (LANs), wide area networks (WANs), public internets, private intranets, a private computer network, a secure internet, a private network, a public network, a value-added network, interactive television networks, wireless data transmission networks, two-way cable networks, interactive kiosk networks, and the like.

The PSTN 212 and the wireless network 214 are known to those of ordinary skill in the art as networks which facilitate both data and voice communications. The PSTN 212 and the wireless network 214 include one or more computers and other communication devices such as, by way of example, telephone switches and communication routers. One example of the wireless network 214 is a web of cell sites connected to a Mobile Telephone Switching Office (otherwise known as a Mobile Switching Center). One example of the PSTN 212 is the Plain Old Telephone Service.

In one embodiment, a user utilizes his or her user computer 202 and accesses the content server computer 204 through the communication medium 208. For example, the user executes a browser on the user computer 202 to enter and browse a web site residing on the content server computer 204. The browser is a software program which allows a user to access different computers, including web sites and the web pages and documents contained in the web sites, accessible over the WWW and the Internet. In one preferred embodiment, the browser may be a standard browser such as the Netscape® Navigator developed by Netscape, Inc. or the Microsoft® Internet Explorer developed by Microsoft Corporation. One of ordinary skill in the art will realize that other types of access software could also be used to implement the browser. The other types of access software could be, by way of example, other types of Internet browsers, custom network browsers, communications software, cable modem software, point-to-point software, custom emulation programs, and the like.

The web site on the content server computer 204 preferably includes one or more notification offering components which offers wireless notification services in conjunction with one or more services such as, e-mail, auction, e-commerce, financial services, gaming, and the like. For example, the content server computer 204 may include a current auction for a laptop computer. The user, interested in purchasing the laptop computer, registers with the content server computer 204 in order to participate in the auction by submitting the appropriate user identification information including a bid for the laptop computer. During the registration process, the user may select a wireless notification option which is provided as part of the auction service, and appropriately provide the MDN for his or her wireless device 210.

In one embodiment, a registration component executing in the content server computer 204 requests and processes the user submitted identification information and advantageously creates a wireless notification profile for the user. The wireless notification profile contains information such as, by way of example, the user's wireless device 210 MDN, the events or messages which are to be forwarded to the user's wireless device 210, how the events or messages are to be presented, for example, voice or text display, and the like. The user may advantageously provide the information maintained in the wireless notification profile. Continuing the auction example, the user may submit a bid of $500 for the lap top computer and request to be notified of any higher bids. This information may advantageously be maintained in the wireless notification profile.

Subsequent to the user selecting the wireless notification service and the creation of the wireless notification profile, the content server computer 204 transmits the information, for example, the wireless notification profile, to the notification system 206. In another embodiment, the notification server 206 may interact with the user, for example, through a registration component such as, by way of example, one or more web pages or other software applications, capable of accepting input over the communication medium 208. The registration component may then process the user submitted information and create the notification profile. For example, subsequent to the user requesting the event notification service, the content server computer 204 may invoke a first web page residing on the notification system 206. The first web page may subsequently be displayed on the user computer 202, and the user may advantageously provide the necessary information to enable the notification system 206 to create the notification profile through the first and other web pages.

The content server computer 204 appropriately records, for example, in a database maintained on the computer, that the user requested the notification service for the specified service. From the record, the content server computer 204 is alerted to forward events associated with the appropriate service to the notification system 206. In one embodiment, the content server computer 204 electronically forwards the event causing the notification system 206 to receive an electronic notification of the event. In continuing the auction example, the content server computer 204 may receive a subsequent bid of $510 from a second bidder. Subsequently, the content server computer 204 advantageously forwards the receipt of the subsequent bid to the notification system 206. The content server computer 204 may advantageously retain a copy of the forwarded event. In another embodiment, the event is retained by the content server computer 204 and a copy of the event is forwarded to the notification system 206. Those of ordinary skill in the art will realize that the content server computer 204 continues to process the information associated with the auction event, for example, the subsequent bid of $510, in order to properly administer the auction, and that the auction event is forwarded to the notification system 206 to facilitate the requested notification function.

Subsequent to receiving an electronic notification of the forwarded event from the content server computer 204, the notification system 206, and in particular, a component of the notification system 206, determines the appropriate user, for example, the user's MDN, and the wireless notification profile. The notification system 206 determines from the appropriate notification profile if the user requested to be notified of the received event message. If the user requested to be notified, the notification system 206 creates a message for the received event. Continuing the auction example, the notification system 206 advantageously determines that the user requested to be notified of the higher bid. The notification system 206 may create a message summary, such as, by way of example, "laptop computer current bid $510," for the received event message. The received event message preferably includes additional information related to the laptop auction and which is not included in the message summary.

In another embodiment, the content server computer 204 may determine if the user requested notification for the particular event. If the user requested to be notified of the particular event message, the content server computer 204 may forward a copy of the event message to the notification system 206. For example, the subsequent bid of $510 for the laptop computer is forwarded to the notification system 206. If the content server computer 204 determines that the user did not request notification for the particular event message, the event message is not forwarded to the notification system 206. For example, the content server computer 204 does not forward an event message specifying the time remaining in the laptop computer auction to the notification system 206. In still another embodiment, the content server computer 204 may create a message summary for the event message and forward the summary message to the notification system 206.

The notification system 206 advantageously assigns a claim check to the message. The claim check is advantageously included in the message. In one embodiment, the claim check is a "line" number to the Interactive Voice Response Unit ("IVRU") of the notification system 2b06. The IVRU may advantageously have more than one "line" number which permit access to the IVRU and which advantageously form a pool of claim checks. The IVRU will be further discussed below.

Figure 3:
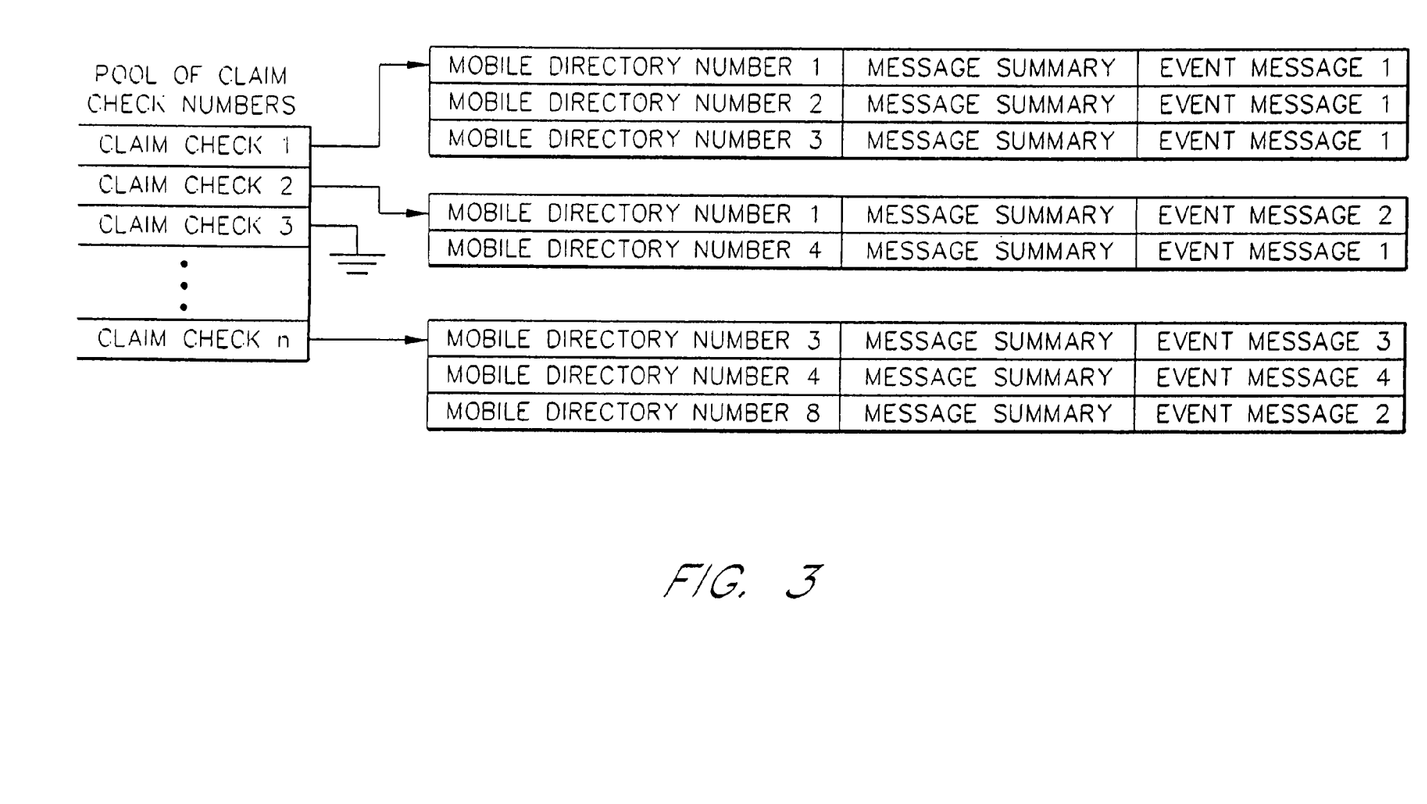
FIG. 3 is a block diagram illustrating one embodiment of the assignment of a claim check to the message summary and the associated event message.

FIG. 3 is a block diagram illustrating one embodiment of the assignment of a claim check to the message and the associated event information. As illustrated in FIG. 3, a particular claim check may advantageously point to and identify one or more events. In one embodiment, each event message is associated with a mobile directory number ("MDN") that corresponds to a user. Therefore, a claim check is unique per event message for a particular user, but may advantageously be shared across event messages for one or more other users. Therefore, in retrieving an event message, the notification system 206 identifies the appropriate event message from both the submitted claim check and the identifier of the user's communications device 210. In another embodiment, each claim check may identify a single event message and each event message may be assigned a unique claim check.

Continuing the auction example, the notification system 206 may assign "claim check 1" to the subsequent bid of $510 for the laptop computer, and include "claim check 1" in the message summary "laptop computer current bid $510." Furthermore, "claim check 1" advantageously points to and identifies the user's MDN, the message summary "laptop computer current bid $510," and the event message indicating the receipt of the higher bid of $510 for the laptop computer.

For example, in FIG. 3, the "mobile directory number 1" pointed to by "claim check 1" may be the user's MDN; the "message summary" pointed to by "claim check 1" may be the message summary "laptop computer current bid $510"; and the "event message 1" pointed to by "claim check 1" may be the event message indicating the receipt of the higher bid of $510 for the laptop computer. Those of ordinary skill in the art will realize that a claim check may point to and identify information other than the MDN, message summary, and event message.

Having received the forwarded event message, the notification system 206 stores the event message in a message database for future retrieval. In one embodiment, the stored content may be different from the forwarded event message. For example, auction notifications may be altered to enable easy reading by the notification system 206. In the case of e-mail events, attachments may be stripped from the e-mails. In one embodiment, both the forwarded event message and the stored content may advantageously be retained, for example, in a database, by the notification system 206. In still another embodiment, the forwarded event message may be retained on the content server computer 204.

Figure 4:
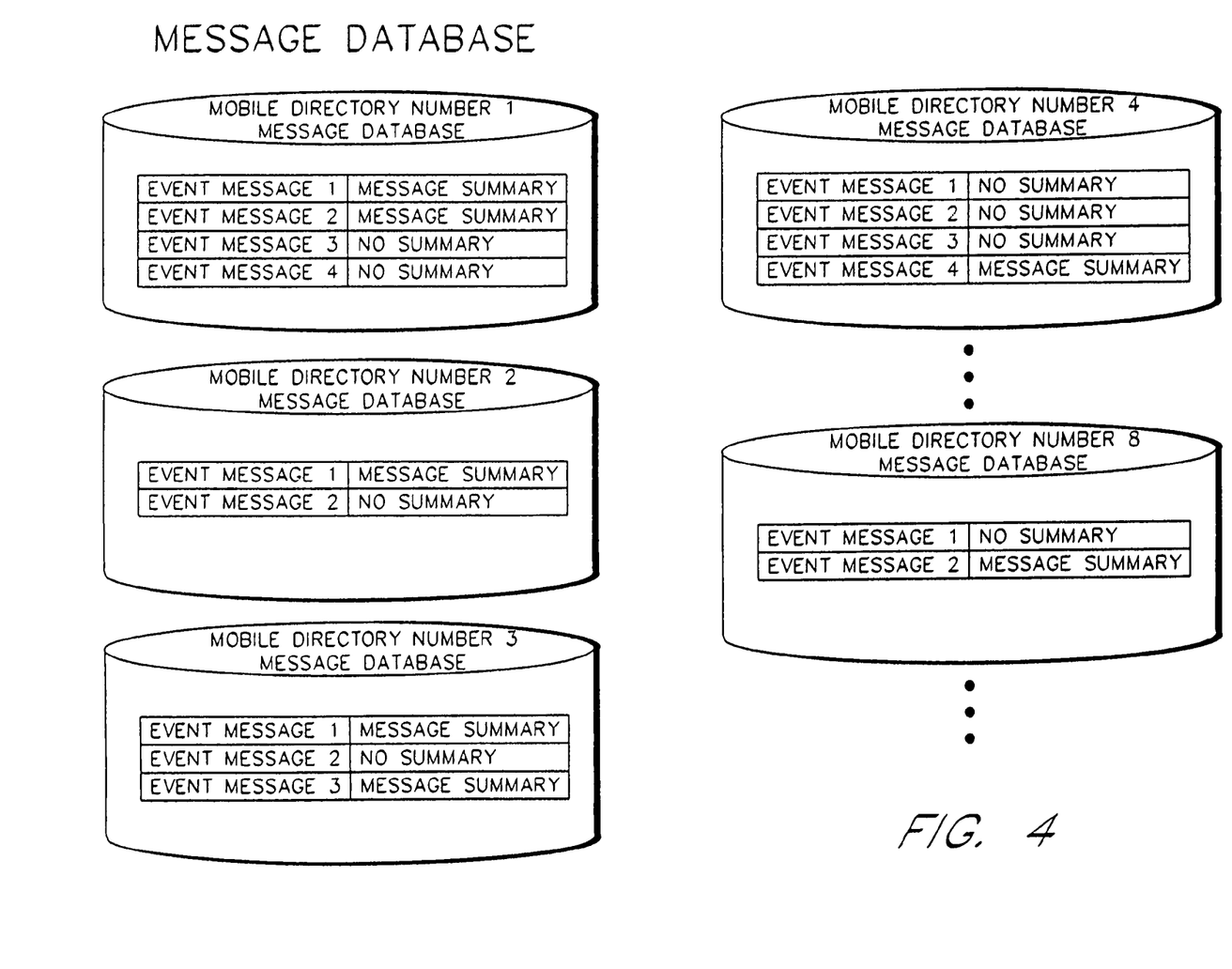
FIG. 4 is a block diagram illustrating one embodiment of a message database.

FIG. 4 is a block diagram illustrating an embodiment of a message database for each user. As is illustrated in FIG. 4, in one embodiment, a message database is identified by the MDN of the user's communications device 210. The event message received for the user is stored in the appropriate message database. Furthermore, if a message summary was created for the event message, the message summary may be stored in the appropriate message database and identified with the associated event message. The message database advantageously also includes forwarded event messages for which the user did not request wireless notification. Thus, the notification system 206 may advantageously permit the user to retrieve event messages the user did not request notification of when the user contacts the notification system 206 to retrieve event messages for which the user was notified.

The message database may include an identifier (not shown), such as a flag, with each event message. The identifier may advantageously identify the appropriate service the event message is associated with. This enables the message database to contain event messages associated with differing services. For example, the user may have requested wireless notification in conjunction with both the auction service and the e-mail service. The event messages associated with the auction service may be identified by a first identifier and the event messages associated with the e-mail service may be identified by a second identifier. In another embodiment, the message database may be implemented as a tree having the MDN at the root and each service occupying a particular branch extending from the root. It is realized by those of ordinary skill in the art that duplicate copies of the event message and its associated massage summary, if one exists, need not be stored on the notification system 206. For example, the information pointed to by the claim check (FIG. 3) may advantageously be stored in the appropriate user's message database.

Subsequent to determining that the user requested notification of the forwarded event message and creating and assigning a claim check to the message summary, the notification component of the notification system 206 calls the identified MDN. In particular, the notification system 206 calls the communications device 210 identified by the MDN utilizing the PSTN 212 and the wireless network 214. Once a connection to the communications device 210 is established, for example, the user answers the incoming call to the communications device 210, the notification system 206 forwards the message summary to the communications device 210. The method by which the message summary is to be forwarded to the user may be specified in the user's wireless notification profile. In one embodiment, the IVRU, which is further discussed below, may read the message summary to the user over the communications device 210. In another embodiment, the message summary may be displayed on the communications device 210 display. In still another embodiment, the user may have provided a pager identification and the message summary is paged to the user's pager.

In one embodiment, the user is provided an option to contact the notification system 206 to retrieve the event message associated with the message summary by pressing a button on the communications device 210. Upon the user selecting the option by depressing the appropriate button, the communications device 210 calls the "line" number as specified by the claim check included as part of the message summary and which was previously received by the communications device 210. The wireless notification system 206 answers the incoming call and authenticates the user, for example, by verifying the identifier of the calling communications device 210. Subsequent to verifying the user, the event message associated with the message summary is retrieved from the message database and read to the user.

Continuing the auction example, the message summary "laptop computer current bid $510" may be read to the user in response to the user answering the incoming call to his or her communications device 210 from the notification system 206. The user may then press the "send" button to initiate a call to the notification system 206. The notification system 206 answers the incoming call, verifies the identifier of the communications device 210, retrieves the event message indicating the receipt of the bid of $510 for the laptop computer, and plays the event message to the user. The event message may include additional information regarding the laptop auction such as, by way of example, the time remaining in the auction, the number of received bids, and the like.

In one embodiment, subsequent to reading the event message, the notification system 206 may advantageously present the user additional options such as, by way of example, deleting the event message, replying to the event message, accessing the next event message, accessing other events which the user requested notification for, and exiting the system. The options may advantageously be read to the user by the IVRU. The user may select the desired option by depressing one or more buttons on the communications device 210 in response to hearing the option. In another embodiment, the user may respond to the option by speaking into the wireless device 210. The notification system 206 includes one or more software modules configured to execute on the notification system 206 and which facilitate the processing of the provided options.

Continuing the auction example, the user may elect to place a higher bid for the laptop computer. The notification system 206 advantageously accepts the user's new bid, for example, $520, and appropriately submits the new bid on behalf of the user to the appropriate content server computer 204. In one embodiment, the user may submit the new bid amount by utilizing the buttons on the communications device 210. In another embodiment, the user may specify the new bid amount by speaking into the communications device 210. In this embodiment, the notification system 206 advantageously includes a speech recognition application, which is well known to those of ordinary skill in the art, capable of converting audio signals into digital signals. In another embodiment, the audio signals may be stored in a common format on the notification system 206.

The notification system 206 includes one or more software modules configured to interface with the content server computer 204, and in particular, the services offering the notification option to users. The software modules may advantageously interface to and interact with the one or more software modules executing on the content server computer 204 which comprise the service functionality. The software modules on the notification system 206 and the content server computer 204 may interface with each other through well known interface mechanisms such as, application scripts, program-to-program interfaces, application program interfaces, and the like. Those of ordinary skill in the art will realize that the degree and complexity of the interface between the notification system 206 and the services provided on the content server computer 204 may vary depending on factors such as the complexity of the service offered by the content server computer 204, the number and complexity of the options provided to the user in conjunction with the wireless event notification, and the like.

Figure 5:
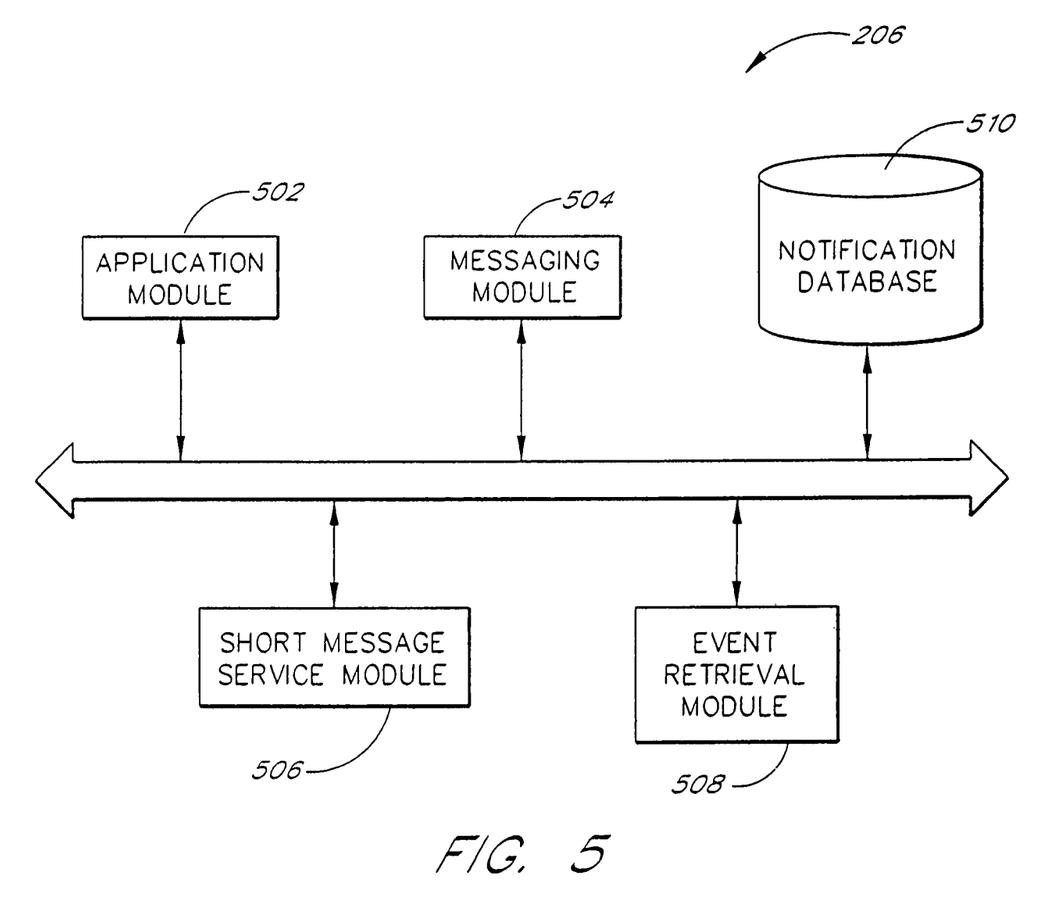
FIG. 5 is a block diagram illustrating one embodiment of certain components of the wireless server system.

FIG. 5 is one embodiment of a block diagram illustrating certain components of one embodiment of the notification system 206. The notification system 206 includes an application module 502, messaging module 504, short message service module 506, an event retrieval module 508, and a notification database 510. The depicted components may advantageously communicate with each other and other components comprising the respective computers through mechanisms such as, by way of example, interprocess communication, remote procedure call, and other various program interfaces. Furthermore, the functionality provided for in the components, modules, and databases may be combined into fewer components, modules, or databases or further separated into additional components, modules, or databases. Additionally, the components, modules, and databases may advantageously be implemented on one or more computers.

The application module 502 includes one or more software program modules configured to interact with the one or more service applications executing on the content server computer 204. The application module 502 may advantageously extend the web site services offered on the content server computer 204. In one embodiment, the application module 502 advantageously provides access to the one or more notification profiles residing on the notification system 206. Thus, the content server computer 204 may provide users the option of interfacing to and accessing the appropriate notification profile which is stored on the notification system 206. As an example, a first web page on the content server computer may provide access, for example, through a hyper link, to a second web page residing on the notification system 206. The second web page may facilitate access to and modification of the data stored in a notification profile.

In another embodiment, the application module 502 may include a registration module which registers one or more users requesting notification of particular events. For example, a notification offering component, such as a service application executing on the content server computer 204, may provide users the option of receiving notification for particular events associated with the service. Subsequent to the user electing the notification option, the notification offering component may advantageously invoke the application module 502 executing on the notification system 206. In particular, the registration module of the application module 502 facilitates the user registration so that the notification system 206 may properly perform the requested notification services. In still another embodiment, the registration module may be configured to execute on the content server computer 204.

The messaging module 504 includes one or more software program modules configured to interact with the one or more service applications executing on the content server computer 204. In one embodiment, the messaging module 504 includes, for example, an event receiving module, an event identification module, and an event summary module. The event receiving module interfaces with and receives event messages from the content server computer 204. The event messages may be received by such mechanisms as, by way of example, Simple Mail Transfer Protocol, Extensible Markup Language, File Transfer Protocol, and the like. The event identification module identifies the appropriate wireless notification profile for the forwarded event message, and from the information in the wireless notification profile, determines if the user requested notification of the forwarded event message. The event summary module creates a message summary for the event messages the user requested notification of.

The short message service module 506 is configured to transmit a short message, typically less than 120 characters, to the communications device 210. In one embodiment, the short message service module includes a notification module which advantageously transmits the summary message to the appropriate communications device 210. The wireless notification module may transmit the summary message by, for example, sending an e-mail to the communications device 210, sending a page, implementing dialup and data transmission software, and the like. Those of ordinary skill in the art will realize that the short message service module 506 may advantageously be implemented as an intelligent peripheral that uses ANSI-41 signaling protocol.

The interactive event retrieval module 508 facilitates the access of information contained in a database, such as the notification database 510, from a remote device such as the communications device 210. In one embodiment, the event retrieval module 508 receives and processes a call from the user. The event retrieval module 508 may advantageously receive and process the incoming call, use information from the one or more databases to authenticate the calling user, retrieve the appropriate event message, and read the retrieved event message.

In another embodiment, the event retrieval module 508 may provide the caller with options to perform additional activities in response to receiving the event message. In still another embodiment, the event retrieval module 508 may provide the user access to his or her notification profile, and permit the user to modify the information contained in the notification profile. Those of ordinary skill in the art will realize that text-to-speech applications may be incorporated into and used by the event retrieval module 508 in performing its function. Furthermore, the interactive voice response module may incorporate one or more scripts and stored messages. The scripts may include logic which determines how and what information is provided to the calling user and the type of information, either keypad or voice, which the user may enter using the communications device 210 or other voice or data transmission mechanism.

The notification database 510 contains portions of the information and data maintained by the notification system 206. The notification database 510 contains, for example, the notification profiles, the message database, the pool of claim checks, and any other information necessary to perform the notification function. Those of ordinary skill in the art will realize that the notification database 510 may be comprised of one or more databases, and the databases may reside on one or more computers. Furthermore, it is appreciated by those of ordinary skill in the art that the functionality of the components and modules disclosed herein may be combined into fewer components and modules or separated into additional components and modules.

Figure 6:
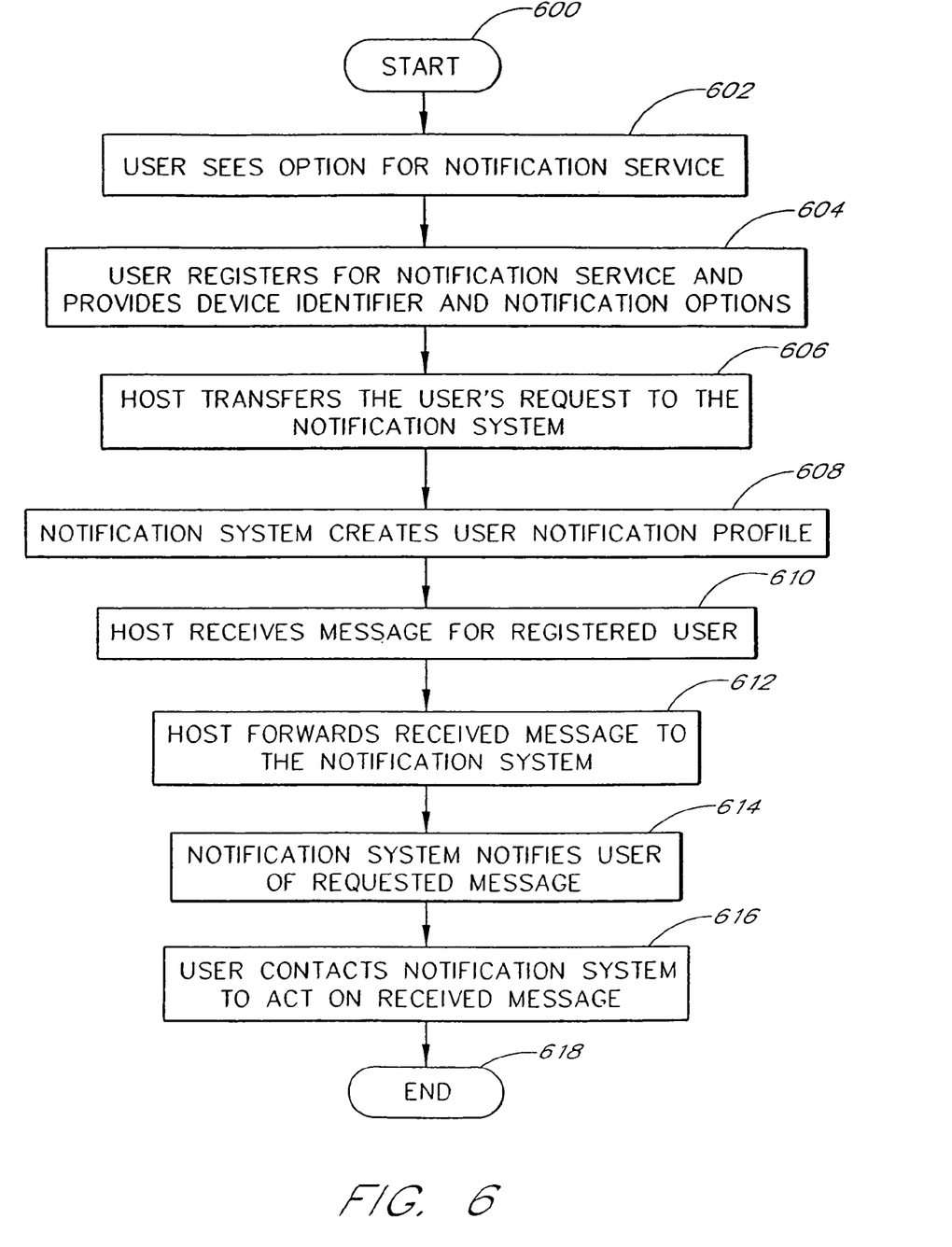
FIG. 6 is a flow chart illustrating one embodiment of a process by which a user requests event notification and subsequently receives the requested notification from the notification system.

FIG. 6 is a flow chart illustrating one embodiment of a process by which a user registers for or requests event notifications and subsequently receives the requested notification from the notification system 206. Starting at a start state 600, the user accesses a content server computer 204, and in particular, the services offered by the content server computer 204. Proceeding to state 602, the user sees an option for a notification service associated with a particular service. For example, a financial service, such as on-line trading, offered by the content server computer 204 may offer notification services.

Proceeding to state 604, the user registers for the offered notification service. In the on-line trading example, the user may register with the on-line trading service and provide identification information and the notification options used in creating the notification profile for the user. The identification information may include information such as name, address, e-mail address, credit card information, preferred method of notification, notification device type and number, and the like. Furthermore, the user may specify the events for which the user desires to be notified of. For example, the user may request to be notified if Company XYZ's stock is offered at $10 or less per share.

Proceeding to state 606, the content server computer 204 transfers the user's request and user information to the notification system 206. In other embodiments, the content server computer 204 and the notification system 206 may form part of the same system.

Proceeding to state 608, the notification system 206 processes the information received from the content server computer 204 and creates a notification profile for the user. Subsequently, the notification system 206 receives a message for the registered user in state 610. For example, the notification system 206 may receive a message indicating that Company XYZ's stock has fallen and that the offered price per share is $9.75.

Proceeding to state 612, the content server computer 204 appropriately determines that the user requested notification services in conjunction with the on-line trading service. In particular, the content server computer 204 forwards the received message regarding the $9.75 per share price for Company XYZ stock to the notification system 206.

Proceeding to state 614, the notification system 206 determines from the appropriate notification profile if the user requested to be notified of the forwarded message. For example, if the forwarded message in prior state 612 was that the trading of Company ABC's stock was being temporarily halted, the notification system 206 may not notify the user of this message. Referring back to the Company XYZ example, the notification system 206, in one embodiment, advantageously determines from the information in the notification profile whether the user has requested to be notified of messages which indicate that Company XYZ's stock is being offered at $10 or less per share, and thus, appropriately notifies the user of the message as discussed in further detail below.

Proceeding to state 616, the user contacts the notification system 206, preferably subsequent to receiving a notification from the notification system 206, to retrieve further information associated with the received message and to appropriately act upon the received message. For example, after receiving the message regarding the price of Company XYZ's stock, the user may contact the notification system 206. The notification system 206 may provide the user additional information regarding the price of Company XYZ's stock.

The notification system 206 may then provide the user one or more options, including the option of purchasing Company XYZ's stock. The user may elect the option to make a purchase and specifies the number of shares to purchase. The notification system 206 may process the information, formulate an appropriate purchase request, and place the stock purchase transaction with the content server computer 204. A subsequent confirmation message confirming the purchase of the requested shares mat be transmitted from the content server computer 204 to the notification system 206 and appropriately forwarded to the user as disclosed herein.

In another embodiment, the user may also have registered for the e-mail service, including the notification service offered in conjunction with the e-mail service, offered by the content server computer and facilitated by the notification system 206. In conjunction with the user contacting the notification system 206 to place the stock transaction, the notification system 206 may advantageously provide the user the option of accessing his or her e-mail messages. The user may then retrieve the e-mail messages (the notification system 206 may read the e-mail messages to the user) and perform appropriate actions, such as responding to a particular e-mail message, forwarding an e-mail message, deleting an e-mail message, and the like. When the user terminates the call, for example, by electing the "exit" option provided by the notification system, the notification system 206 proceeds to end state 618. Those of ordinary skill in the art will realize that the one or more services for which the notification system provides notification services for may be offered by a single host or one or more different hosts.

Figure 7:
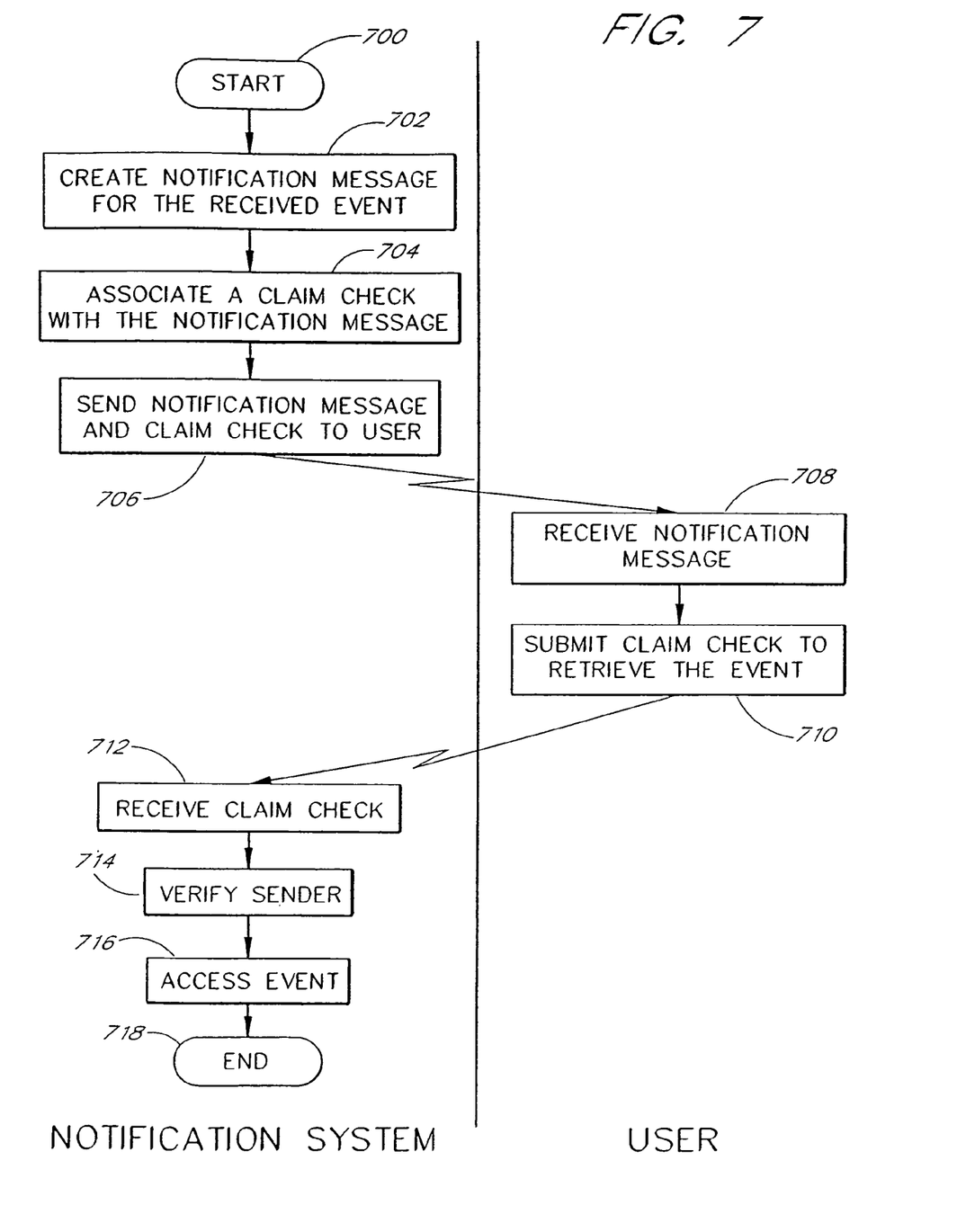
FIG. 7 is a flow chart illustrating an embodiment of a process by which an embodiment sends and responds to event notifications.

An embodiment of the generation of the notification sent the user is further illustrated in FIG. 7. Beginning in a start state 700, the notification system 206 receives an electronic notification of an event, such as an e-mail message or other form of an event message. In one embodiment, the notification system 206 uses the notification database 510 to determine if the user requested to be notified of the received event. Proceeding to state 702, if the user requested notification of the particular event, the notification system 206 creates a communications message for the communications device 210. In one embodiment, the communications message may include data or information about the received event.

Proceeding to state 704, the messaging module 540 in the notification system 206 associates a claim check with the notification message. In one embodiment, the claim check is used to identify the associated event. The claim check may advantageously be one of many phone numbers which are maintained by the notification system and which may be used to contact the notification system. In another embodiment, the claim check may be an identifier, such as a number, used by the notification system to identify the appropriate event. Proceeding to state 706, the notification system sends the notification message and the claim check to the user. The claim check is sent to a communications device. In one embodiment, the notification message and the claim check are sent a wireless communications device 210 (FIG. 2).

Proceeding to state 708, the user receives the notification message transmitted by the notification system on his or her communications device 210. In one embodiment, the user is notified of the notification message by an audible signal transmitted by the communications device 210. The user may acknowledge the arrival of the notification message by appropriately responding to the audible signal. For example, the user may acknowledge the receipt of the notification message by depressing a key, such as the "send" key, on the communications device 210, in response to hearing the audible signal. In one embodiment, the user's acknowledgement causes the notification message to be displayed on the communications device's 210 display. In another embodiment, the notification message is read to the user through the communications device 210 subsequent to the user appropriately acknowledging the receipt of the notification message. In still another embodiment, the notification system may transmit the notification message to a pager designated by the user.

Subsequent to the user receiving the notification message, the user is provided an option to retrieve the event associated with the notification message in state 710. In particular, the user may submit the received claim check to retrieve the appropriate event. In one embodiment, the user may submit the claim check by pressing a designated key, such as the "send" key, on the communications device 210 in response to the retrieve event option. This causes the communications device 210 to call the notification system 206 using the claim check. In another embodiment, the user may submit the claim check at a later time. For example, the user may call the notification system 206 using the claim check. Once connected, the user may submit proper identification, such as, by way of example, the communication device's 210 identification number, to retrieve the associated event. In still another embodiment, the user may contact the notification system and subsequently submit the claim check with the appropriate identification information in order to retrieve the associated event. In yet another embodiment, the identification and claim check may be entered through a computer connected to the notification system 206.

Reverting back to the notification system 206, the claim check is received by the notification system 206 in state 712. In one embodiment, the claim check is received and identified by the phone number dialed to connect to the notification system 206. As previously discussed, the claim check is preferably a phone number which may be used by the user to contact the notification system 206. Proceeding to state 714, the notification system 206 verifies the sender of the claim check received in previous state 712. The sender of the claim check may advantageously be verified by authenticating the communication device's 210 identifier such as the mobile directory number ("MDN"). For example, the mobile directory number is the phone number of the communications device 210. In one embodiment, the identifier of the communications device 210 is transmitted by the identifier of the communications device 210 to the notification system 206. In another embodiment, the identifier may be supplied by the user, for example, when the user contacts the notification system 206 utilizing a device other than his or her communications device 210.

Subsequent to the notification system 206 authenticating the sender in previous state 714, the notification system 206 retrieves the event associated with the received claim check in state 716. In particular, the retrieved event is transmitted to the user. In one embodiment, the notification system 206 reads the retrieved event to the user, and the user hears the event through the device utilized by the user to submit the claim check, for example, the communications device 210. In another embodiment, the notification message is displayed on the communications device 210. In still another embodiment, the notification system 206 displays the retrieved event, for example, on the computer utilized by the user to submit the claim check. Subsequent to the notification system 206 transmitting the retrieved event to the user, the notification system 206 proceeds to end state 718.

While the invention has been described with reference to the exemplary embodiments thereof, those skilled in the art will be able to make various modifications to the described embodiments of the invention without departing from the true spirit and scope of the invention.

What is claimed is:

1. A method of providing electronic event notification to a physical wireless communication device, comprising:

pre-registering, at a registration system component, a physical wireless consumer communication device interested in wireless notification of given subject matter;

receiving, at a physical notification server, an electronic event message addressed to said physical wireless consumer communication device;

determining if said electronic event message includes content matching said given subject matter preregistered for said physical wireless consumer communication device;

assigning a claim check, from among a pool of claim checks, pointing to said received electronic event message;

transmitting, from said notification system, a notification message including said assigned claim check, to said pre-registered physical wireless consumer communication device pre-registered to receive said electronic event message;

authenticating a user response message from said pre-registered physical wireless consumer communication device relating to said claim check; and triggering, in response to said authentication of said user response message, transmission of said electronic event message, addressed back to said pre-registered physical wireless consumer communication device.

2. The method of providing electronic event notification to a physical wireless communication device according to claim 1, further comprising:

disassociating said user response message from said electronic event message once said user response message is authenticated.

3. The method of providing electronic event notification to a physical wireless communication device according to claim 2, further comprising:

associating said user response message with another electronic event message after said user response message is authenticated.

4. The method of providing electronic event notification to a physical wireless communication device according to claim 1, further comprising:

identifying said electronic event message based on said claim check;

wherein said claim check is assigned after said user response message is authenticated.

5. The method of providing electronic event notification to a physical wireless communication device according to claim 1, further comprising:
   associating said physical wireless consumer communication device with an entity.

* * * * *